April 1, 1952  L. A. COLLIS  2,591,237
CONVEYER
Filed Oct. 19, 1949  2 SHEETS—SHEET 1
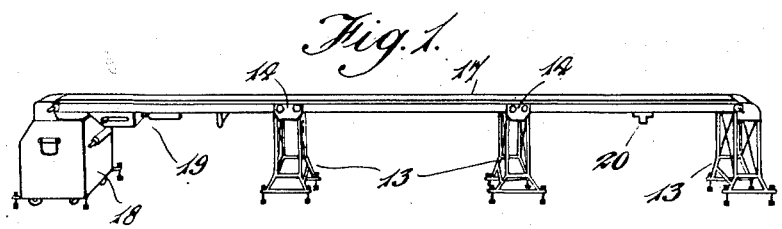
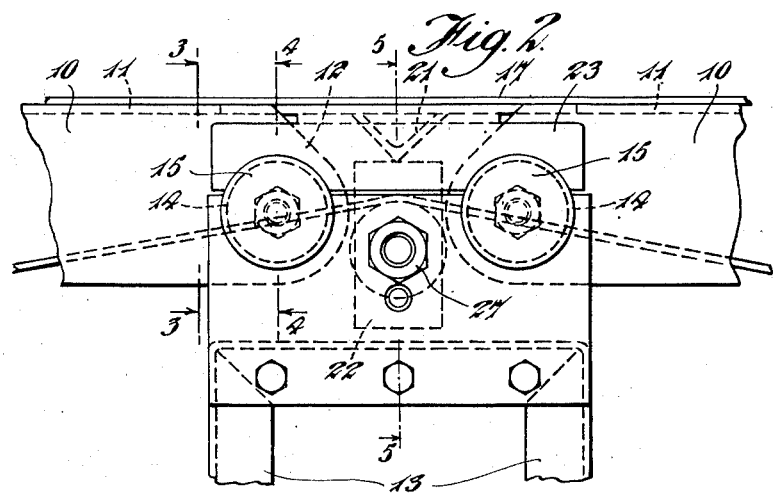
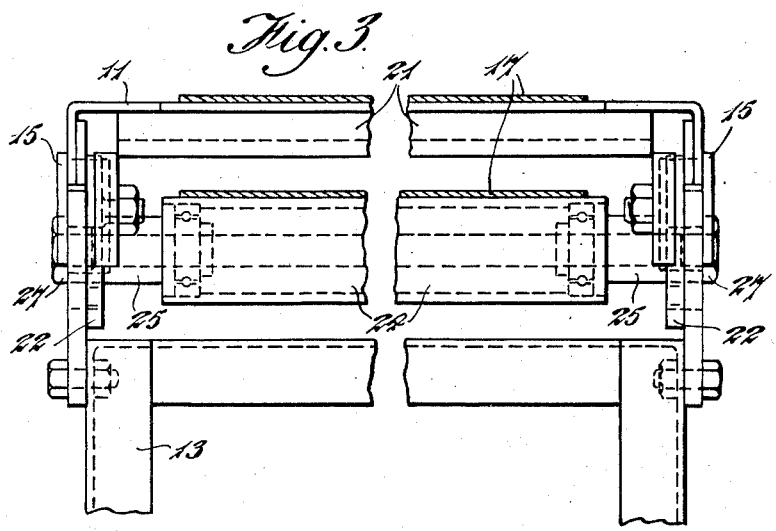
INVENTOR:
LESLIE ALFRED COLLIS
BY Richardson, David and Nordon
ATTYS

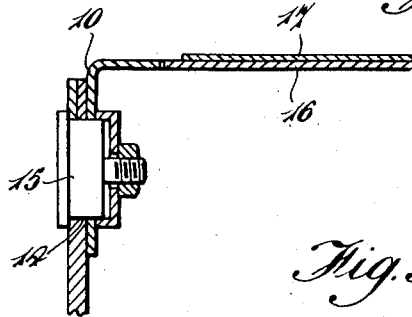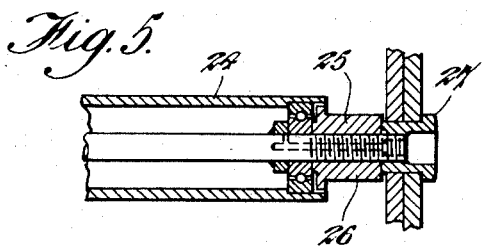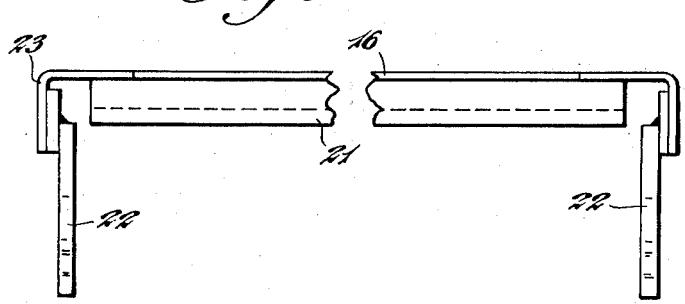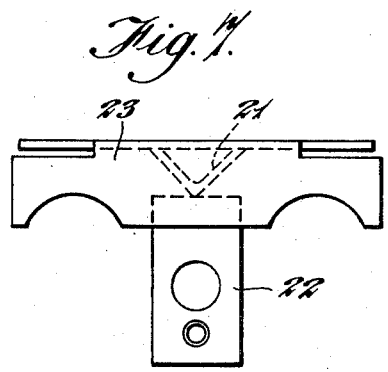

Patented Apr. 1, 1952

2,591,237

UNITED STATES PATENT OFFICE 2,591,237

CONVEYER

Leslie Alfred Collis, Radlett, England

Application October 19, 1949, Serial No. 122,187
In Great Britain October 4, 1948

3 Claims. (Cl. 198—204)

This invention relates to conveyors, more particularly belt conveyors.

In the specification of United States Patent No. 2,563,427, dated August 7, 1951 there is described a belt conveyor which is made up of a number of conveyor units each comprising a frame within which the conveyor belt is mounted in the usual way on, at least, end rollers, the spindles of which run in bearings on the outside of the frame, the bearings at the ends of two consecutive units being carried by cradles whereby there are spaced at a predetermined distance apart and the spindles being coupled together by means of a removable self-contained coupling unit engaging therewith. By this means a conveyor of any desired length may be provided by the assembly of the required number of units end to end. It will be appreciated however, that with such a unit form of conveyor there is a space between the ends of the belts of consecutive units, and with a view to overcoming any disadvantage due to such space it was proposed to provide a skid plate between the ends of the conveyor. The provision of such a skid plate effectively overcomes any disadvantage due to the unit system when comparatively large articles are to be conveyed, but it will be appreciated that where small articles, such for example as peas or powders, are to be conveyed, the provision of the skid plate will not overcome the disadvantage. The chief object of the present invention is, therefore, to provide an improved form of conveyor which, whilst retaining most of the advantages of the unit system of construction described in the specification of the said United States Patent No. 2,563,427, may be used for conveying all kinds of articles.

According to the present invention the conveyor is built up from a number of conveyor frame sections which are supported end to end by any suitable means such as stands, slings or the like and a single belt is provided for the whole length of the conveyor.

By this means will be a simple matter to build up a conveyor frame of the desired length by the assembly of the units end to end.

Bridge pieces may be provided extending completely over the gap between the ends of the conveyor frame sections so that a smooth table may be provided under the belt throughout the whole length of the conveyor.

In order that this invention may be the more clearly understood and readily carried into effect, reference may be made to the accompanying drawings which illustrate, by way of example, one convenient embodiment of this invention and in which:

Figure 1 is a perspective view of a three-unit belt conveyor according to the present invention, Figure 2 is a side elevation of the upper end of one of the stands showing the manner in which the ends of the conveyor frame units are supported intermediate the ends of the conveyor, Figure 3 is a section on line 3—3 of Figure 2, the conveyor frame units having been omitted from this view for the sake of clearness.

Figure 4 is a part local section on line 4—4 of Figure 2, and

Figure 5 is a part local section on line 5—5 of Figure 2.

Figure 6 is an end elevation of the preferred form of bridge-piece for bridging the gap between the ends of the conveyor frame units, and Figure 7 is a side elevation of said bridge-piece.

Referring now to the accompanying drawings, in the embodiment of the present invention therein illustrated, the conveyor frame units are similar to those described in specification of the said United States Patent No. 2,563,427 and comprise a table 11 having down-turned side edges 10 which are provided with extensions 12 (see Figure 2).

The conveyor frame units are adapted to be supported by stands 13 which, again, are similar to the stands described in specification of the said United States Patent No. 2,563,427 and have at their upper ends the double cradles 14 for supporting the conveyor frame units. It will be appreciated that, except at the ends of the whole conveyor, it is unnecessary to provide rollers at the ends of the conveyor sections and in order that the conveyor frame sections may be located in the cradles 14, it is convenient to provide the extensions 12 on the side members 10 with outstanding headed-plugs 15 (see Figures 2 and 4) which are a snug fit in the cradles 14. A bridge-piece 16, of a construction described more fully hereinafter, is also provided completely to bridge the gap between the ends of the tables 11 of adjoining conveyor frame units. Having built up a smooth top conveyor frame by the assembly of the required number of sections, or units, as above described, a single belt 17 is provided extending the whole length of the conveyor and the necessary drive is applied to one end or the other, as is found convenient. The drive may be obtained from a power cabinet 18 of a construction described more fully in the copending patent application referred to above. Only a single belt tensioner, illustrated diagrammatically at 19, Figure 1, may be necessary, and if a drift corrector such, for example, as that described in the specification of British Patent No. 623,329 be required, it is only necessary to provide a single drift corrector illustrated diagrammatically at 20 in Figure 1, to control the whole conveyor.

The belt 17 is preferably under tension and, in order to avoid all possibility of the conveyor frame sections buckling where they adjoin one another, it is preferable to lock the ends of the conveyor frame sections to the cradles. This can most conveniently be done by means of the bridge-piece. Referring now more particularly to Figures 2, 6 and 7 of the accompanying drawings, the bridge-piece 16, which is transversely reinforced as at 21, is provided with downwardly depending strips 22 adapted to lie inside the upper end of the stand and, spaced from the said strips 22 so as to lie outside the upper end of the stands 13 when the bridge-piece is in position, are double yokes 23 which when the bridge-piece is in position become positioned over the top of the plugs 15 (see Figures 2 and 4) so that, once the strips 22 are secured to the upper end of the stand, not only will the ends of the conveyor units be firmly locked to the stands but, in addition, the bridge-piece itself will be secured in position. A very convenient way of securing the downwardly depending strips 22 to the upper ends of the stands 13, and at the same time ensuring that the belt 17 shall not sag on to the stand, is to provide a roller 24 across the strips 22. The roller 24 is provided at each end with a distance-piece 25 surrounding a screwed spindle 26, and an internally screw-threaded locking nut 27 is screwed over the end of the spindle 26 from the outside of the stand, the locking nut 27 passing through the stand and the strip 22. The roller 24 is disposed underneath the belt 17 as shown in Figure 2, and will ensure that the belt will not sag on to the stand.

The conveyor according to the present invention may be used for the conveyance of all kinds of articles and it has the advantage that it may be produced very cheaply since the number of bearings and rollers required for a given length is very substantially reduced as compared with a conveyor built up from units as described in the specification of the said United States Patent No. 2,563,427. Furthermore, the friction is substantially reduced so that less power will be required to drive a conveyor of a given length.

Although it is preferred to locate the ends of the conveyor frame sections on the stands or the like by means of outstanding plugs seating into cradles, any other desired means of locating the ends of the conveyor frame sections on the stands or slings may be employed without departing from the scope of the present invention.

I claim:

1. A belt conveyor comprising a plurality of conveyor sections each comprising a pair of side members, a table joining said side members, extensions at each end of said side members and plugs outstanding from said extensions, supports for supporting said conveyor sections end to end, double cradles on said supports to receive the plugs on the juxtaposed ends of adjoining conveyor sections, bridge pieces bridging the gaps between the tables of adjoining conveyor sections, double yokes on said bridge pieces bearing on the plugs in the associated cradles, means for securing said bridge pieces to said supports to lock the plugs in the cradles, and a single endless belt extending the whole length of the conveyor.

2. A belt conveyor as defined in claim 1 having rollers located below the bridge pieces and below the belt to prevent the belt sagging on to the supports.

3. A belt conveyor as defined in claim 2 having downwardly depending strips at the ends of the bridge pieces carrying said rollers, and single securing means at each of said downwardly depending strips co-axial with the roller for securing the roller and the bridge piece to the associated support.

LESLIE ALFRED COLLIS.

REFERENCES CITED

The following references are of record in the file of this patent:

UNITED STATES PATENTS

| Number | Name | Date |
|--------|------|------|
| 2,105,889 | Madeira | Jan. 18, 1938 |